(12) United States Patent
Peck et al.

(10) Patent No.: US 6,259,980 B1
(45) Date of Patent: Jul. 10, 2001

(54) AUTOMATED CONTROL SYSTEM FOR REMOTE VEHICLES

(75) Inventors: Alex N. Peck, Commack; Edward V. Sullivan, Huntington, both of NY (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/176,031

(22) Filed: Oct. 21, 1998

(51) Int. Cl.[7] .................................................. G06F 17/00
(52) U.S. Cl. .................................................. 701/24; 701/36
(58) Field of Search ........................ 701/1–3, 11, 22–24, 701/29, 33, 36, 41, 51, 65, 70, 99

(56) References Cited

U.S. PATENT DOCUMENTS

| | | | |
|---|---|---|---|
| 2,138,426 | 11/1938 | Nelson ................................. | 192/194 |
| 4,155,417 | 5/1979 | Ziems ................................... | 180/98 |
| 4,361,202 | 11/1982 | Minovitch ........................... | 180/168 |
| 4,735,274 | 4/1988 | Good et al. .......................... | 180/204 |
| 4,931,930 | 6/1990 | Shyu et al. ............................ | 701/36 |
| 5,299,130 | 3/1994 | Ono ....................................... | 701/25 |
| 5,318,143 | 6/1994 | Parker et al. ........................ | 180/168 |
| 5,369,591 | 11/1994 | Broxmeyer ............................ | 701/301 |
| 5,400,864 | 3/1995 | Winner et al. ........................ | 180/169 |
| 5,430,645 | * 7/1995 | Keller .................................... | 701/29 |
| 5,646,843 | * 7/1997 | Gudat et al. .............................. | 701/3 |

* cited by examiner

Primary Examiner—William A. Cuchlinski, Jr.
Assistant Examiner—Edward Pipala
(74) Attorney, Agent, or Firm—Terry J. Anderson; Karl J. Hoch, Jr.

(57) ABSTRACT

Apparatus for automatically controlling operation of a self-propelled vehicle comprises a plurality of operating systems for performing specific functions relating to the operation of the vehicle, each of the operation systems including controller devices for automatically performing a specific function and selectively operable manual components for directly overriding the controller devices and manually performing the specific function. A central processor coordinates operation of the operating systems. The operating systems include: (1) a steering wheel and a steering controller having an active mode for automatically operating the steerable wheel under the direction of the central processor and an inactive mode allowing manual operation of the steering wheel; (2) an accelerator pedal and a throttle controller having an active mode for automatically controlling fuel delivery to a fuel injector under the direction of the central processor and an inactive mode allowing manual operation of the accelerator pedal; (3) a brake pedal and a braking controller having an active mode for automatically operating the brakes under the direction of the central processor and an inactive operating the brakes under the direction of the central processor and an inactive mode allowing manual operation of the brake pedal; and (4) a gear ratio selector and a transmission controller having an active mode for automatically operating the multi-ratio transmission under the direction of the central processor and an inactive mode allowing manual operation of the gear ratio selector.

18 Claims, 5 Drawing Sheets

AUTOMATED CONTROL SYSTEM FOR REMOTE VEHICLES

BACKGROUND OF THE INVENTION

1. Field of the Invention

The present invention relates generally to an automated control system for a remote vehicle and, more particularly, to such a control system which allows for specific operations to be manually overridden, as desired.

2. Description of the Prior Art

Numerous attempts have been made heretofore to automate the operations of remote vehicles or to control the operation of vehicles automatically for the convenience of their human operators or for reasons of increased safety. The patent literature provides numerous examples of know appliances of this nature. For example, U.S. Pat. No. 5,400,864 to Winner et al. discloses a system wherein automatic speed control of a vehicle is provided, along with the spacing of the vehicle from a preceding vehicle. The control system may be overridden for a limited time so that a driver may accelerate to pass another vehicle.

U.S. Pat. No. 4,735,274 to Good et al. discloses an automatic parallel parking system for a vehicle wherein scanners provide vehicle position information to a microprocessor which controls the steering while the driver controls vehicle speed.

U.S. Pat. No. 4,361,202 to Minovitch relates to an automated road transportation system wherein the individual vehicles are provided with both manual controls and an automatic guidance system which causes the vehicle to follow a guide rail embedded in the roadway. A steering wheel torque sensor is connected so that a torque applied to the steering wheel by an occupant will place control of the vehicle under manual control. The guidance system uses signals from various sensors to control steering and speed and a passenger may designate a destination which the guidance system will then use in selecting routes.

U.S. Pat. No. 4,155,417 to Ziems relates to an automatic steering system for a farm vehicle wherein the vehicle may be automatically steered in response to sensed data and wherein the automatic steering is disengaged by a steering input applied to the manual steering wheel by a human driver.

The following U.S. patents disclose various mechanisms for automatic control of a motor vehicle:

| Pat. No. | Inventor(s) | Issued |
| --- | --- | --- |
| 5,369,591 | Broxmeyer | 11/29/94 |
| 5,318,143 | Parker et al. | 06/07/94 |
| 5,299,130 | Ono | 03/29/94 |
| 4,931,930 | Shyu et al. | 06/05/90 |
| 2,138,426 | Nelson | 11/29/38. |

It was with knowledge of the foregoing state of the technology that the present invention has been conceived and is now reduced to practice.

SUMMARY OF THE INVENTION

The present invention relates to apparatus for automatically controlling operation of a self-propelled vehicle which comprises a plurality of operating systems for performing specific functions relating to the operation of the vehicle. Each of the operating systems includes controller devices for automatically performing a specific function and selectively operable manual components for overriding the controller devices and manually performing the specific function. A central processor coordinates operation of the operating systems. The operating systems include: (1) a steering wheel and a steering controller having an active mode for automatically operating the steerable wheel under the direction of the central processor and an inactive mode allowing manual operation of the steering wheel; (2) an accelerator pedal and a throttle controller having an active mode for automatically controlling fuel delivery to a fuel injector under the direction of the central processor and an inactive mode allowing manual operation of the accelerator pedal; (3) a brake pedal and a braking controller having an active mode for automatically operating the brakes under the direction of the central processor and an inactive mode allowing manual operation of the brake pedal; and (4) a gear ratio selector and a transmission controller having an active mode for automatically operating the multi-ratio transmission under the direction of the central processor and an inactive mode allowing manual operation of the gear ratio selector.

In arriving at the disclosed innovations, the inventors have been involved in the process of automating an off-the-shelf vehicle which served both as a platform for a wide variety of investigations into machine intelligence, and as a technology demonstrator capable of using the latest state-of-the art sensors, actuators, and software techniques. When the automation process was completed, onboard computers were capable of controlling all major vehicle components, including the throttle, steering, brakes, transmission, and starter. As constructed, the system can be manually overridden and operated normally, for example, permitting the vehicle to be driven to test sites as needed. The vehicle also permits operation in both semi-autonomous and learning modes. The semi-autonomous mode permits operator inputs to be fused with vehicle sensor inputs, which are then used for vehicle control. An example of this is parking with collision avoidance. The operator steers the vehicle in the general direction of the desired parking spot and the collision avoidance system controls the speed to assure a rapid, collision free maneuver. Because the vehicle systems all include feedback from the user interfaces (steering, throttle, brakes and transmission) it is also possible for the system to apply learning algorithms to match sensor input to operator control commands. Safety, reliability, simplicity, durability and cost are among the significant design criteria for the automation effort.

This installation is a device that allows a vehicle to be steered, for drive gears to be selected, for speed and braking to be regulated by a remote means as well as manually on demand. The remote systems may be cable connected to a computer or a wireless receiver obtaining transmitted data from an isolated source. The computer provides motor control signals and can provide data from a variety of sensors. The data to the controls permits instantaneous response to road conditions and obstacles whether or not there is an operator present. In the event of an emergency the operator could gain completer control by the slightest touch of the steering wheel, brakes, gear selector, or override button. The device is a simple, inexpensive installation which can, because of its compact size, be installed in many vehicles especially where assistance to the operator may be required in an emergency situation; i.e. ambulance, police, fire or rescue vehicles, military hardware such as tanks and armored personnel carriers. The internal components are naturally air cooled, to maintain a higher operating efficiency in the event of excessive engine overheating. The configuration provides a natural baffling for a well distributed air flow. The cool air source is fan forced through the firewall, routed through the equipment and exhausted within the engine compartment. The positioning of the assembly allows for easy accessibility to internal vehicle air which is constant, cleaner and cooler then outside ducted forced air.

Under normal automatic driving conditions, the device monitors the position of the front wheels via a positioning encoder and corrections are automatically implemented as needed by the computer source to maintain that course. Motor torque information is also available by monitoring motor current, either by a motor load resistor, or a motor driver current mirror. During this operation, a motor output turns both the power steering input and the steering wheel, through a gearhead, allowing a load cell to turn freely. Since there is no opposing force by the steering wheel, there is no force on the load cell. At any point, the operator may intervene and maintain full control of the vehicle by simply turning the steering wheel. At this instant, a twisting movement is applied to the load cell due to resistance from a dual input. As a result, the signal from the load cell shuts off the motor while the encoder continues to monitor shaft position for as long as the vehicle is in motion and allows the operator to have complete control in a normal manner. Upon releasing the wheel, the force on the load cell drops to zero and the motor regains steering control from the exact position the wheels were in when the operator relinquished control. The motor current is monitored so that torque induced by the road surface can be distinguished from operator generated steering torques.

A second control sub-assembly allows for manual or automatic drive selection. The shaft output of the control motor has a flywheel type linkage arrangement with the vehicle steering column. Drive selection is determined by the current position of an encoder. The computer control activates a linear actuator, unlocking a shift lever on the vehicle steering column via a control cable. A control rod rotates via an actuator motor, moving the steering column linkage to the desired position. Once the selection has been made, the linear actuator releases the shift lever for a positive lock on the steering column. If manual selection is required, the operator overrides the system by simply making the selections by hand. Pulling on the shift lever from inside the vehicle shuts down the auto-control electrically via limit switches and mechanically by disengaging the system at the "one-way" linkage. Arranging the system in this manner does not allow the linear actuator to become engaged but allows the actuator motor to be back driven as needed while the position encoder keeps track of the present gear selection. The third control sub-assembly regulates the vehicle braking from its current seed down to zero mph. The actuator is physically similar to the steering actuator but incorporates a speed/torque ratio which is compatible to the reaction time of the braking system demands. When braking is required, the actuator motor is activated, rotating a cam and exerting a downward force on a brake cable attached to the brake. This action pulls the brake pedal arm inward, causing the brakes to be applied, slowing the vehicle. The brake cable is a direct connection between a load cell and the vehicle brake pedal arm. The brake cable is set a predetermined tension by setting a cable tension adjuster. The force on the cable puts the load cell in constant tension, typically a force between 1 and 2 lbs. This pre-load becomes the new zero point of the load cell and any pressure changes results in an automatic partial rotation of the cam and a compensation of the tension to it's original zero point. This reduction of cable tension may be a result of temperature changes or a signal for a periodic manual readjustment. However, the most immediate cause would be from a manually activated slowing or sudden stop by an operator. This rapid reduction in tension is sensed by the control system via the load cell. A rapid cable tension reduction does not activate the brake cam but signals that a manual braking is in progress and the brake motor control is modified as necessary. Once manual braking is completed and the cable released, the pre-loaded tension returns to the cable once again pre-loading the load cell and reactivating the automatic braking features.

In short the autonomous vehicle modified in accordance with the invention has been designed to be a low cost, safe, and reliable outdoor experimental demonstrator. This vehicle serves as a testing platform for the modular control system. The software architecture used at least in the initial testing stags allows the examination of a wide variety of machine intelligence techniques, including autonomous navigation, route planning, machine learning, and the like. The open hardware architecture permits the easy addition of a wide variety of sensors and actuators required to implement and improve such capabilities.

A primary feature, then, of the present invention is the provision of an automated control system for a remote vehicle.

Another feature of the present invention is the provision of such a control system which allows for specific operations to be manually overridden, as desired.

A further feature of the present invention is the provision of such a control system which enable existing vehicles to be readily retrofitted to receive the system of the invention.

Still another feature of the present invention is the provision of such a control system which incorporates a plurality of operating systems for performing specific functions relating to the operation of the vehicle, each of the operating systems including controller means for automatically performing a specific function and selectively operable manual means for overriding said controller means and manually performing the specific function and a central processor for operating and coordinating operation of the plurality of operating systems.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general term. Like numerals refer to like parts throughout the disclosure.

DETAILED DESCRIPTION OF THE PREFERRED EMBODIMENTS

Figure 1:
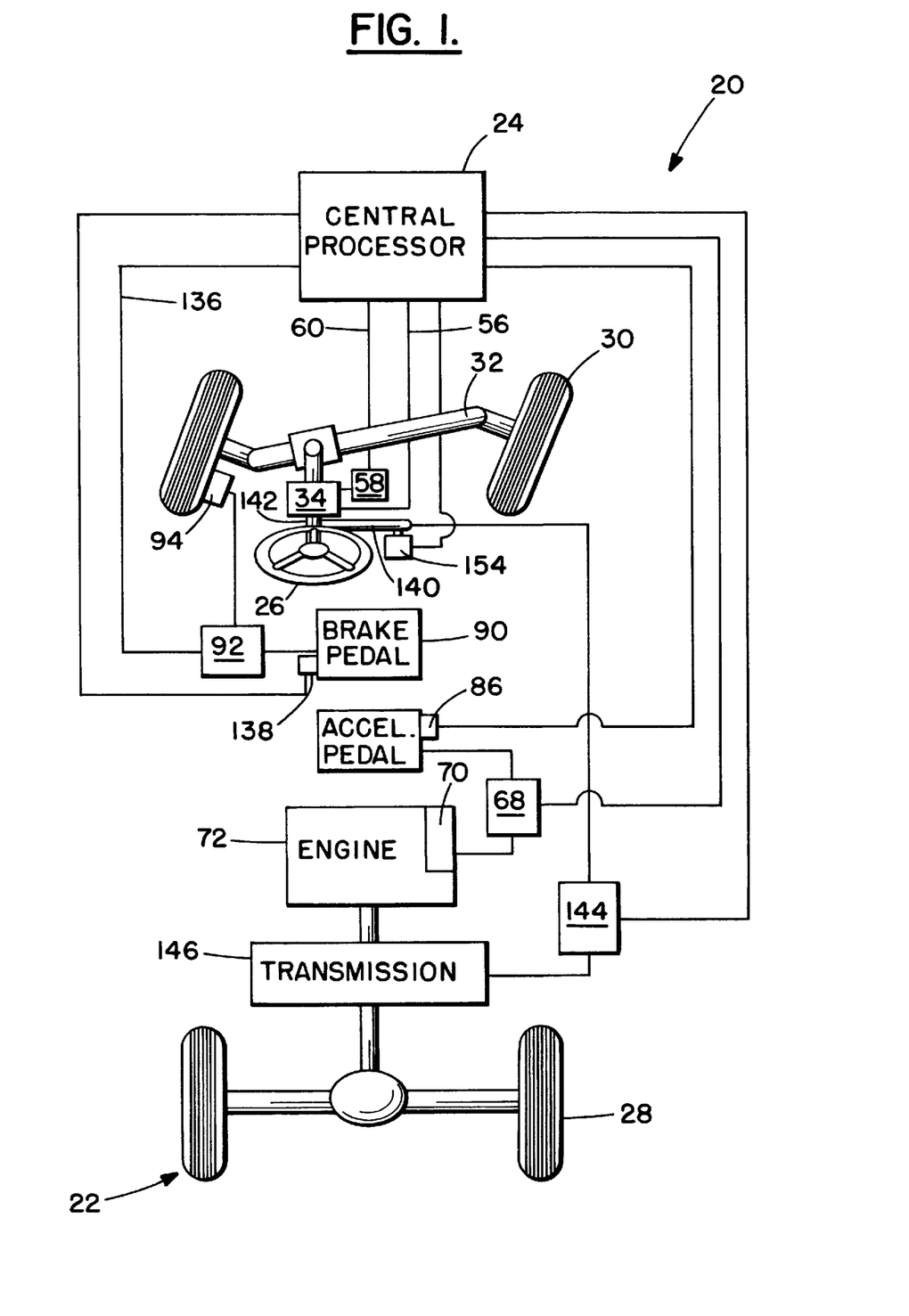
FIG. 1 is a diagrammatic view illustrating apparatus embodying the invention for automatically controlling operation of a self-propelled vehicle.
Figure 2:
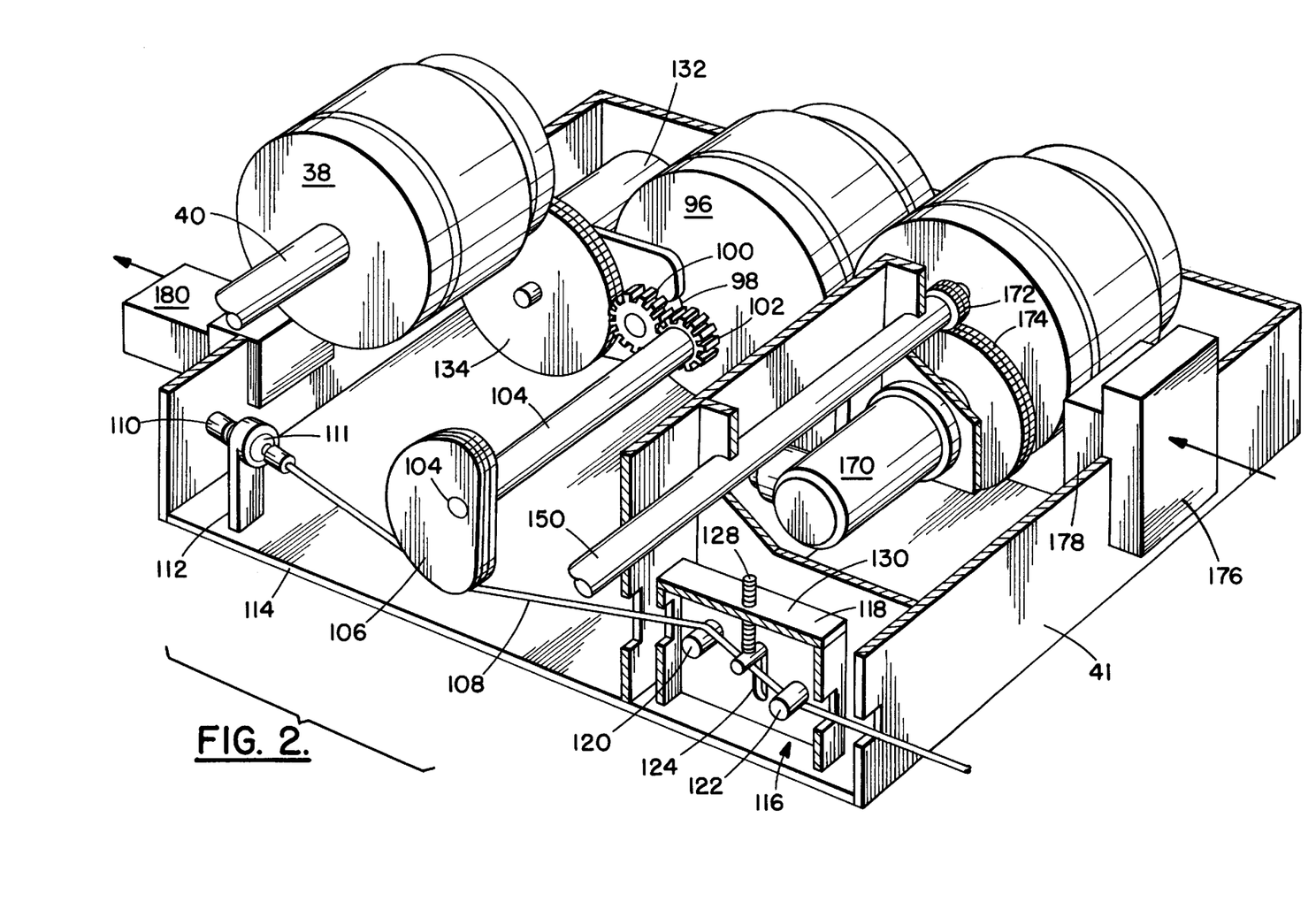
FIG. 2 is a perspective view of a plurality of operating systems for the apparatus illustrated in FIG. 1, certain parts being cut away and shown in section.

Turn now to the drawings and, initially, to FIG. 1 which generally illustrates apparatus 20 for controlling operation of a self-propelled vehicle 22. The apparatus 20 includes a plurality of operating systems for performing specific functions relating to the operation of the vehicle. As will be described, each of the operating systems includes a controller device for automatically performing a specific function and selectively operable manual device for overriding the controller device and manually performing the specific function. A central processor 24 of suitable size and configuration is employed for operating and coordinating operation of all of the operating systems.

In a first instance, in typical fashion, the vehicle 22 is illustrated diagrammatically as being equipped with a conventional steering wheel 26, non-steerable rear wheels 28 and steerable front wheels 30 which are pivotally connected to a tie bar 32. A steering controller 34 is operatively connected between the steering wheel 26 and the tie bar 32 and effectively replaces conventional standard detachable steering column linkage (not shown) which connects the steering wheel with a power steering unit 36, if such exists.

The steering controller 34 has an active mode for automatically operating the steerable front wheels 30 under the direction of the central processor 24 and an inactive mode allowing manual operation of the steering wheel to manually operate the steerable wheels, perhaps with the aid of the power steering unit 36.

Figure 3:
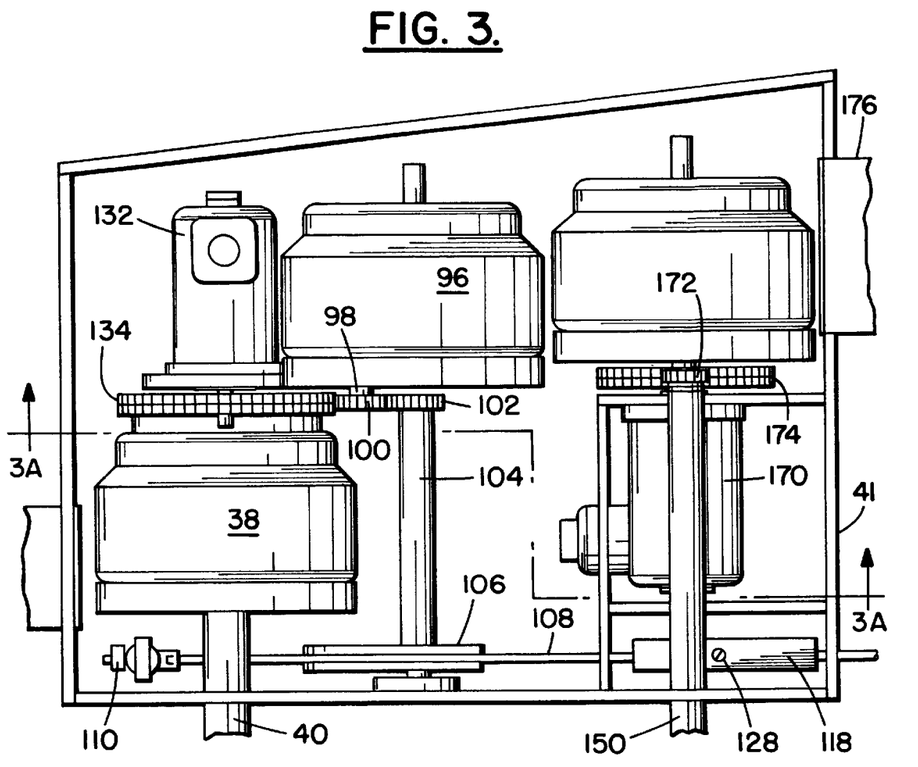
FIG. 3 is a top plan view of the operating systems illustrated in FIG. 2.
Figure 3A:
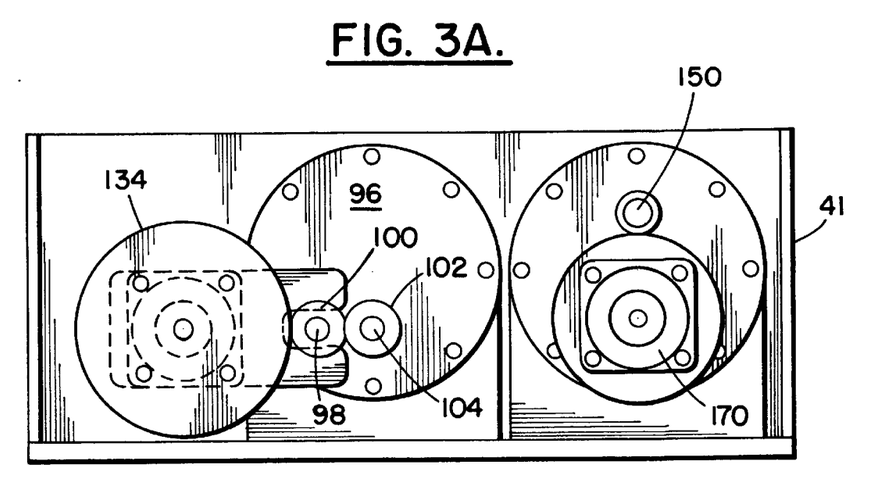
FIG. 3A is a cross section view taken generally along line 3A—3A in FIG. 3.
Figure 4:
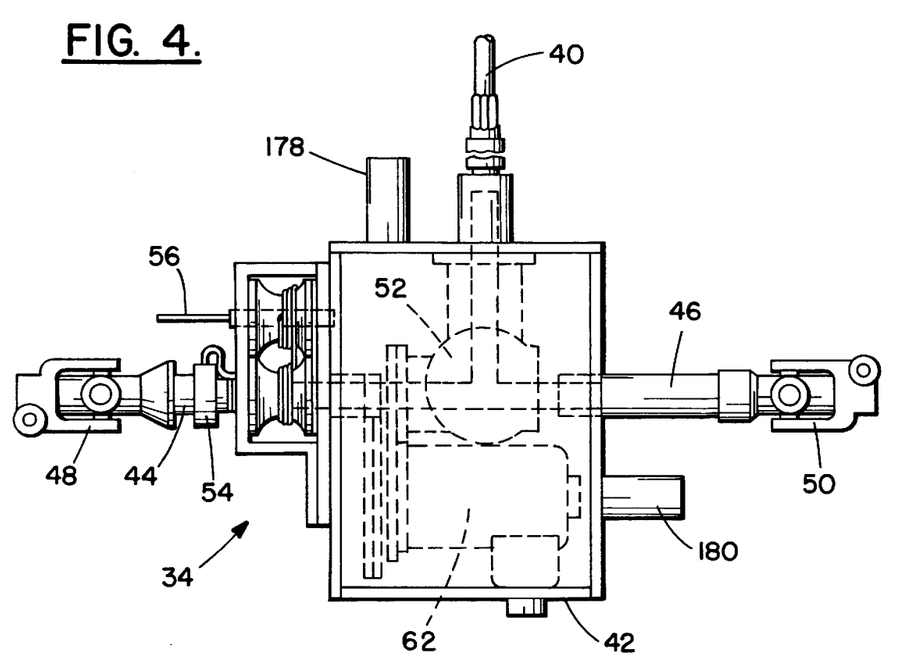
FIG. 4 is a detail plan view of an additional operating system of the invention.

With reference now to FIGS. 1, 2, 3 and 4, the steering controller 34 includes a steering control motor 38 and, preferably, a flexible steering drive cable 40 which drivingly connects the steering control motor and the steerable front wheels 30. The steering control motor is mounted within a protective casing 41 which similarly houses other components which will be described. It was earlier explained that the steering controller 34 replaces conventional standard detachable steering column linkage which connects the steering wheel with a power steering unit 36, if such exists. As seen in FIG. 4, the steering controller 34 is largely encompassed by a protective case 42 from which rotatably project forward and aft stub shafts 44, 46 respectively. The forward stub shaft 44 connects to the tie bar 32, or power steering unit 36, through a forward universal joint 48 and the aft stub shaft 46 connects to the steering wheel 26 through an aft universal joint 50. A 1:1 dual input gear head 52 mechanically interconnects the steering drive cable 40 and the forward and aft stub shafts 44, 46 so that the output from the steering control motor 38 is effectively transmitted, when desired, to the steerable front wheels 30 and to the steering wheel 26.

A load cell 54 having the nature of a pressure sensitive switch is mounted on the forward stub shaft 44 and its responsive (a) to manual movement of the steering wheel 26 operating through the aft stub shaft 46 and the gear head 52 for signaling the central processor 24 to de-energize the steering control motor 38 and (b) to lack of manual movement of the steering wheel for signaling the central processor to energize the steering control motor. The appropriate signal from the load cell 54 is directed to the central processor 24 via a signal lead 56.

A suitable steering control motor current sensor 58 is suitably arranged to generate an output signal proportional to the electrical current drawn by the control motor 38. The central processor is responsive to the output signal from the sensor 58 via an electrical lead 60 for operating the steering control motor 38. The sensor 58 thus keeps the central processor apprised of the status of operation of the steering control motor 38.

The steering controller 34 also includes a suitable steering encoder 62 located within the protective case 42 which operatively engages with the gear head 52 and through a 4:1 gear head 64 with the forward stub shaft 44. The steering controller 34 serves to establish a null position of the shafts 44, 46 for monitoring their position in relation to the null position, for generating a signal proportional to the difference between the monitored position and the null position, and for transmitting the signal to said central processing means via the signal lead 56. The central processor 24 is responsive to the signal from the steering encoder 62 to energize the steering control motor 38 to return the shafts 44, 46 to the null position upon return of the steering controller to the active mode.

With this construction, the steering control motor is effective to steer the vehicle 22, but when an operator takes the steering wheel in hand, by reason of the load cell 54, the motor 38 is de-energized until such time that the operator releases the steering wheel.

The control apparatus 20 also includes an accelerator pedal 66 which may also be manually operable as in the manner of devices mounted on the steering column or on the steering wheel itself. In this instance, a throttle controller 68 is operatively connected between the accelerator pedal and a fuel injecting device 70 for the powerplant 72 of the vehicle 22. The fuel injecting device may be of any commonly used type, carburetor, fuel injector, or the like. As with the steering controller 34, the throttle controller 68 has an active mode for automatically controlling fuel delivery to the fuel injecting device under the direction of the central processor and an inactive mode allowing manual operation of the accelerator pedal to manually operate the fuel injecting device.

The throttle controller 68 includes a throttle control actuator 74 which is operable under the direction of the central processor 24 when in the active mode. Viewing FIG. 5, a throttle control mechanism 76 drivingly connects the throttle control actuator 74 and the accelerator pedal 66. A latch mechanism 78 extends between the throttle control actuator and the accelerator pedal and includes first and second engageable latch member 80, 82, respectively. A suitable construction is provided for biasing the latch members together, indicated diagrammatically by a tension spring 84 when the throttle controller is in the active mode. However, the throttle control actuator 74 is operable to move the first and second latch members 80, 82 apart when the throttle controller is in the inactive mode.

Figure 5:
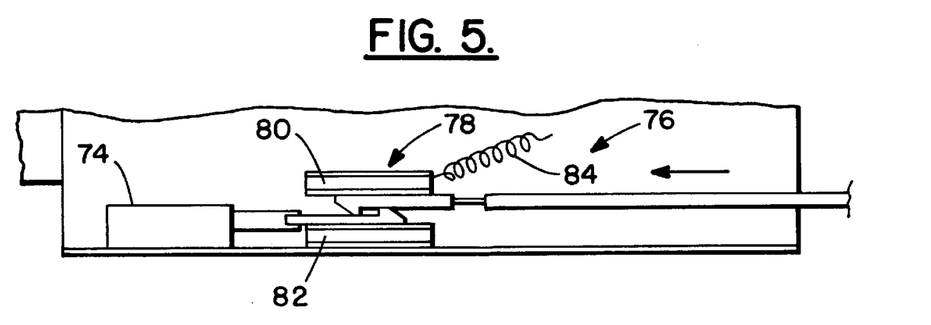
FIG. 5 is a detail plan view of a throttle control mechanism used by the invention.

The active or inactive mode of the throttle controller is determined by means of a pressure sensor 86. When the operator's foot is on the accelerator pedal, the pressure sensor 86 is activated to inform the central processor 24 of this fact causing the inactive mode to be invoked. When the operator's foot is released from the accelerator pedal, the pressure sensor 86 is activated to inform the central processor 24 of this fact causing the active mode to be reinstated.

The control apparatus 20 also includes a brake pedal 90 which may be conventionally configured, and a braking controller 92 operatively connected between the brake pedal and brakes 94 on at least one vehicle wheel. The braking controller 92 has an active mode for automatically operating the brakes under the direction of the central processor and an inactive mode allowing manual operation of the brake pedal to manually operated the brakes.

Figure 6:
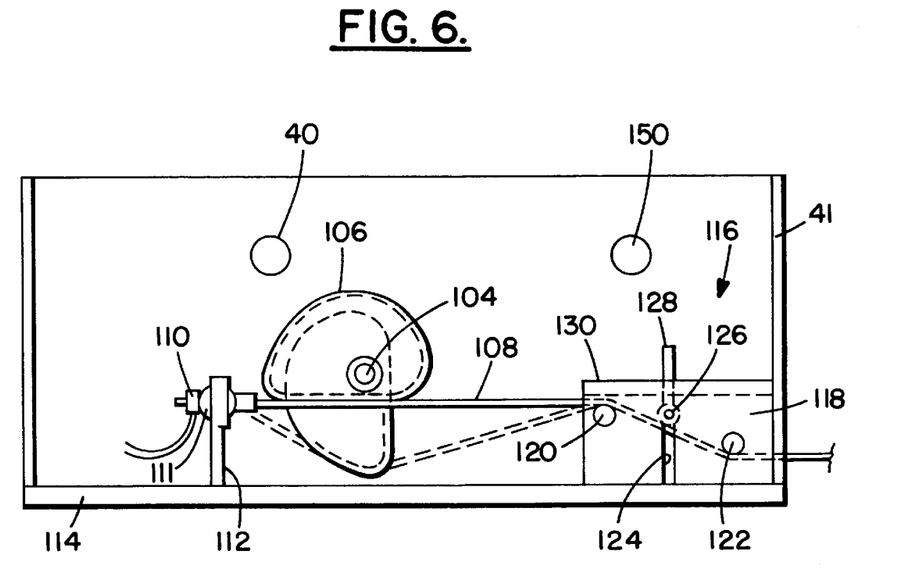
FIG. 6 is an elevation view illustrating components shown in FIGS. 2 and 3.

Viewing especially FIGS. 3 and 6, the braking controller 92 includes a braking control motor 96 suitably mounted within the protective casing 96 adjacent the steering control motor 38. A braking drive gear train drivingly connects the braking control motor 96 and the brakes 94 of the vehicle 22. More specifically, an output shaft 98 is drivingly connected via engaged pinion gears 100, 102 with a rotatable braking drive shaft 104. A braking control cam 106 is mounted on the braking drive shaft for rotation therewith.

A brake cable 108 is stretched between a load cell 110 and the brake pedal 90. The load cell 110 is integral with a swivel assembly 111 on a mounting bracket 112 upstanding from a base plate 114 of the protective housing 41. A tension adjustment mechanism 116 is provided for imparting a predetermined tension to the brake cable. To this end, a pair of spaced apart parallel tension control plates 118 are mounted in upstanding fashion on the base plate 114 and a pair of longitudinally spaced (in relation to the brake cable 108) cable guides 120, 122 extend transversely between the plates. The brake cable passes over the cable guide 120 and under the cable guide 122 as it extends to the brake pedal 90. The tension control plates 118 are formed, respectively, with a pair of aligned upright slots 124. A tension adjustment pin 126 extends above and across the brake cable 108 and at its opposite ends is freely received in the upright slots 124. A tension adjustment screw 128 is threadedly engaged with a tapped through hole in a cover plate 130 unitary with and extending across the tension control plates 128. A lowermost end of the adjustment screw 128 is engaged with the tension adjustment pin 126. By screwing and/or unscrewing the tension adjustment screw 182, a predetermined tension is imparted to the brake cable 108. This predetermined tension, or pre-load, typically two pounds, but of any appropriate magnitude, is used to calibrate the load cell 110.

The load cell 110 is responsive (1) to a tension in excess of the predetermined tension for signaling the central processor 24 to de-energize the braking control motor 96 and (2) to lack of manual movement of the brake pedal for signaling the central processor to energize the baking control motor.

The braking control cam 106 mounted on the braking drive shaft for rotation therewith is aligned for engagement with the brake cable for adjusting tension in the brake cable 108 and thereby operating the brakes of the vehicle 22 under the control of the central processor 24. Thus, if the operator of the vehicle 22 presses the brake pedal 90, the tension on the brake cable 108 relaxes with the result that the load on the load cell 110 falls below the predetermined value established by the tension adjustment mechanism 116. This causes the braking control motor 96 to be energized to rotate cam 34 in a clockwise direction into engagement with the brake cable 108 and continues to rotate until the load cell detects the predetermined magnitude of tension previously established. If the operator of the vehicle 22 releases the brake pedal 60, the motor 96 rotates the cam 106 in the opposite direction until the previously established magnitude of tension in the brake cable 108 is again detected by the load cell 110. Throughout this operation, the swivel assembly is operable to assure that regardless of the orientation of the brake cable 108, the load being applied to the brake cable as detected by the load cell 110 is always in alignment with the longitudinal axis of the brake cable. Additionally, a braking encoder 132 is operatively connected with the braking control motor 96 to establish a null position of the braking drive shaft 104 for monitoring its position in relation to the null position. More specifically, a gear head 134 which is preferably of the anti-backlash type is engaged with the pinion gear 100 so that rotation of the shaft 104 is imparted to the braking encoder 132. In turn, the braking encoder generates a signal proportional to the difference between the monitored position and the null position of the shaft 104 and that signal is transmitted to the central processor via lead 136. The central processor, in turn, is responsive to the signal from the braking encoder to energize the braking control motor to return the braking drive shaft 104 and the braking control cam 104 thereon to the null position.

The active or inactive mode of the braking controller is determined by means of a pressure sensor 138. When the operator's foot is on the brake pedal, the pressure sensor 138 is activated to inform the central processor 24 of this fact causing the inactive mode to be invoked. When the operator's foot is released from the brake pedal, the pressure sensor 138 is activated to inform the central processor 24 of this fact causing the active mode to be reinstated.

The control apparatus 20 also includes a gear ration selector 140 which may be conventionally configured, mounted for example on the steering column 142 of the vehicle 22. A transmission controller 144 is operatively connected between the gear ratio selector 140 and a multi-ratio transmission 146 for the vehicle. The transmission controller 144 has an active mode for automatically operating the multi-ratio transmission under the direction of the central processor means and an inactive mode allowing manual operation of the gear ratio selector.

The transmission controller 144 includes a gear selector control motor 148 and a gear selector drive assembly drivingly connecting the gear selector control motor and the gear ratio selector for movement among a plurality of discrete operating positions. The drive assembly, in turn, includes a gear selector shaft 150 driven by and rotatable with the gear selector control motor 148. The shaft 150 may be of the flexible variety and suitably connected with the gear ratio selector. The drive assembly also includes a transmission encoder 152 for establishing a null position of the gear selector shaft 150 for monitoring position of the gear selector shaft in relation to the null position, for generating a signal proportional to the difference between the monitored position and the null position of the gear selector shaft, and for transmitting the signal to the central processor 24. In turn, the central processor 24 is responsive to the signal from the transmission encoder 152 to energize the gear selector control motor to return the gear selector shaft to the null position upon return of the steering controller to the active mode.

The transmission controller 144 also includes a suitable shift locking mechanism 154 (FIG. 7) which is selectively engageable with the gear ratio selector 140 and may be solenoid operated, for example, to selectively maintain the gear ratio selector temporarily fixed in a selected position. The shift locking mechanism includes a shift locking actuator 156, a shift locking cable 158 connected at one end to said gear ratio selector 140, and a latch mechanism 160 extending between the shift locking actuator and the shift locking cable. The latch mechanism 160 includes first and second mutually engageable latch members 162, 164 and a suitable device diagrammatically indicated as a tension spring 166 for biasing the latch members together when the transmission controller 144 is in the active mode. Oppositely, the shift locking mechanism 154 is operable to move the latch member 162, 165 apart when the transmission controller 144 is in the inactive mode.

Figure 7:
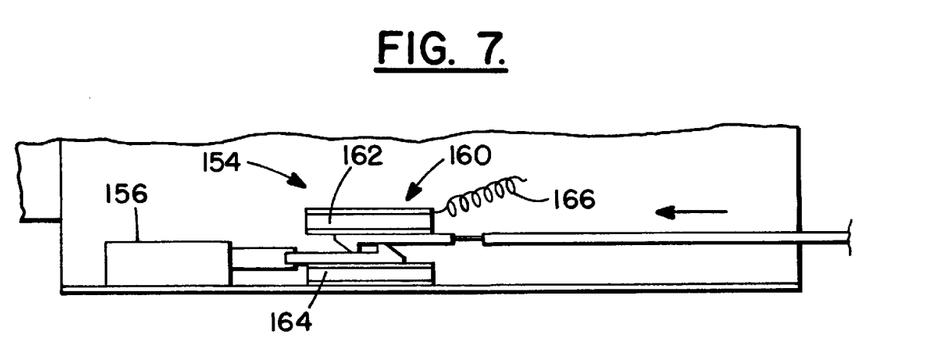
FIG. 7 is a detail plan view of a shift locking mechanism used by the invention.

In one embodiment, the transmission controller 144 may include a suitable inclinometer 168 which is responsive to the attitude of the vehicle 22 and generates an output signal proportional thereto. In this instance, the central processor 24 is responsive to the output signal from the inclinometer for automatically operating the shift locking actuator 156 and then the gear selector control motor 148 to select the appropriate gear ratio for continued operation of the vehicle.

Also, the transmission controller 144 includes a transmission encoder 170 which is operably connected to the gear selector control motor 148 via engaged gears 172, 174 to establish a null position of the gear selector shaft 150 for monitoring position of the gear selector shaft in relation to the null position, for generating a signal proportional to the difference between the monitored position and the null position of the gear selector shaft means, and for transmitting the signal to the central processor 24. In turn, the central processor is responsive to the signal from the transmission encoder to energize the gear selector control motor to return the gear selector shaft to the null position upon return of the transmission controller to the active mode.

For reasons of simplicity and minimized initial expense and subsequent maintenance, it is preferred that the protective casing 41 and protective case 42 and the operating systems within them be air cooled. To this end, for example a suitable cooling fan apparatus 176 may be provided for drawing cooling air into the protective casing 41 Similarly, as shown with respect to protective case 42, inlet and exhaust ducts 178, 180 may be provided, respectively, for introducing cooling air into, and for exhausting warm air from, the protective case or casing While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. Apparatus for controlling operation of a self-propelled vehicle comprising:
    a plurality of operating systems for performing specific functions relating to the operation of the vehicle, each of said operating systems including controller means for automatically performing a specific function and selectively operable manual means for directly overriding said controller means and manually performing the specific function; and
    central processing means for operating and coordinating operation of said plurality of operating systems.

2. Apparatus as set forth in claim 1 wherein said plurality of operating systems includes:
    a steering wheel; and
    a steering controller operatively connected between said steering wheel and at least one steerable wheel supporting the vehicle on a surface, said steering controller having an active mode for automatically operating the steerable wheel under the direction of said central processing means and an inactive mode allowing manual operation of said steering wheel to manually operate the steerable wheel;
    an accelerator pedal; and
    a throttle controller operatively connected between said accelerator pedal and fuel injecting means for the vehicle's powerplant, said throttle controller having an active mode for automatically controlling fuel delivery to the fuel injecting means under the direction of said central processing means and an inactive mode allowing manual operation of said accelerator pedal to manually operate the fuel injecting means;
    a brake pedal; and
    a braking controller operatively connected between said brake pedal and brakes on at least one vehicle wheel, said braking controller having an active mode for automatically operating the brakes under the direction of said central processing means and an inactive mode allowing manual operation of said brake pedal to manually operate the brakes; and
    a gear ratio selector; and
    a transmission controller operatively connected between said gear ratio selector and the multi-ratio transmission for the vehicle, said transmission controller having an active mode for automatically operating the multi-ratio transmission under the direction of said central processing means and an inactive mode allowing manual operation of said gear ratio selector.

3. Apparatus as set forth in claim 2 including:
    air cooled protective casing means for housing said plurality of operating systems.

4. Apparatus as set forth in claim 2 including:
    cooling fan means for drawing cooling air into said air cooled protective casing means; and
    exhaust duct means for exhausting warm air from said air cooled protective casing means.

5. Apparatus as set forth in claim 2 including:
    a first air cooled protective casing for housing said steering controller.

6. Apparatus as set forth in claim 2 including:
    a second air cooled protective casing for housing said throttle controller, said braking controller, and said transmission controller.

7. Apparatus as set forth in claim 2 wherein said steering controller includes:
    a steering control motor;
    steering drive means drivingly connecting said steering control motor and the steerable wheel;
    steering motor current sensing means generating on output signal proportional thereto;
    said central processing means responsive to said output signal for operating said steering control motor;
    shaft means connecting said steering controller and said steering wheel; and
    load cell means on said shaft means responsive to manual movement of said steering wheel for signaling said central processing means to de-energize said steering control motor and to lack of manual movement of said steering wheel for signaling said central processing means to energize said steering control motor.

8. Apparatus as set forth in claim 7 wherein said steering controller includes:
    encoder means establishing a null position of said shaft means for monitoring position of said shaft means in relation to the null position, for generation a signal proportional to the difference between the monitored position and the null position of said shaft means, and for transmitting the signal to said central processing means;

said central processing means responsive to the signal from said encoder means to energize said steering control motor to return said shaft means to the null position upon return of said steering controller to the active mode.

9. Apparatus as set forth in claim 2 wherein said throttle controller includes:

a throttle control actuator operable under the direction of said central processing means when in the active mode;

throttle control means drivingly connecting said throttle control actuator and the accelerator pedal;

latch means extending between said throttle control actuator and said throttle control means and including first and second mutually engageable latch members and means biasing said first and second latch members together when said throttle controller is in the active mode, said throttle control actuator operable to move said first and second latch members apart when said transmission controller is in the inactive mode.

10. Apparatus as set forth in claim 2 wherein said braking controller includes:

a braking control motor;

braking drive means drivingly connecting said braking control motor and the brakes of the vehicle; and load cell means on said braking drive means responsive to manual movement of said brake pedal for signaling said central processing means to de-energize said braking control motor and to lack of manual movement of said brake pedal for signaling said central processing means to energize said braking control motor.

11. Apparatus as set forth in claim 10 wherein said braking drive means includes:

a brake cable stretched between said load cell means and said brake pedal; and tension adjustment means for imparting a predetermined tension to said brake cable;

said load cell means responsive to a tension in excess of said predetermined tension for signaling said central processing means to de-energize said braking control motor and to lack of manual movement of said brake pedal for signaling said central processing means to energize said braking control motor.

12. Apparatus as set forth in claim 11 wherein said braking drive means includes:

a rotatable braking drive shaft driven by said braking control motor; and a braking control cam mounted on said braking drive shaft for rotation therewith and in engagement with said brake cable for adjusting tension in said brake cable and thereby operating the brakes of the vehicle under the control of said central processing means.

13. Apparatus as set forth in claim 10 wherein said braking controller includes:

braking encoder means establishing a null position of said braking drive means for monitoring position of said braking drive means in relation to the null position, for generating a signal proportional to the difference between the monitored position and the null position of said braking drive means, and for transmitting the signal to said central processing means;

said central processing means responsive to the signal from said braking encoder means to energize said steering control motor to return said braking drive means to the null position upon return of said braking controller to the active mode.

14. Apparatus as set forth in claim 2 wherein said transmission controller includes:

gear selector control motor means; and gear selector drive means drivingly connecting said gear selector control motor and said gear ratio selector for movement among a plurality of discrete operating positions.

15. Apparatus as set forth in claim 14 wherein said transmission controller includes:

shift locking means for selectively maintaining said gear ratio selector temporarily fixed in a selected position.

16. Apparatus as set forth in claim 15 wherein said shift locking means includes:

a shift locking actuator;

a shift locking cable connected at one end to said gear ratio selector; and latch means extending between said shift locking actuator and said shift locking cable and including first and second mutually engageable latch members and means biasing said first and second latch members together when said transmission controller is in the active mode, said gear selector control actuating means operable to move said first and second latch members apart when said transmission controller is in the inactive mode.

17. Apparatus as set forth in claim 14 wherein said transmission controller includes:

inclinometer means responsive to the attitude of the vehicle and generating an output signal proportional thereto;

said central processing means responsive to said output signal from said inclinometer means for automatically operating said gear selector control actuating means.

18. Apparatus as set forth in claim 14 wherein said gear selector drive means includes:

encoder means establishing a null position of said gear selector shaft means for monitoring position of said gear selector shaft means in relation to the null position, for generating a signal proportional to the difference between the monitored position and the null position of said gear selector shaft means, and for transmitting the signal to said central processing means;

said central processing means responsive to the signal from said encoder means to energize said gear selector control motor to return said gear selector shaft means to the null position upon return of said transmission controller to the active mode.

* * * * *